Patented Feb. 10, 1953

2,628,244

UNITED STATES PATENT OFFICE 2,628,244

TRIALKYLSILYLCYCLOHEXANOLS AND PREPARATION THEREOF

John L. Speier, Jr., Pittsburgh, Pa., assignor to Dow Corning Corporation, Midland, Mich., a corporation of Michigan No Drawing. Application December 7, 1950, Serial No. 199,728

6 Claims. (Cl. 260—448.2)

This invention relates to trialkylsilylcyclohexanols and to methods for the production thereof.

The trialkylsilylcyclohexanols of this invention are of the general formula $R_3SiC_6H_{10}OH$, in which R is an alkyl radical such as methyl, ethyl, propyl, octadecyl or the like.

It is an object of this invention to provide novel and useful organosilicon compounds of the above general formula, and a method for their preparation.

The above compounds are prepared by reacting a trialkylsilylphenoxytrialkylsilane with hydrogen in the presence of Raney nickel, thus forming a trialkylsilylcyclohexyloxytrialkylsilane, which is then hydrolyzed to produce the trialkylsilylcyclohexanols of this invention. The hydrogenation is carried out at a reaction temperature above 75° C., and preferably between 90° and 140° C. The reaction is conducted preferably under a hydrogen pressure of greater than 500 pounds per square inch. If desired an inert diluent may be used in carrying out the hydrogenation. Any of the inert saturated compounds commonly used in hydrogenation reactions as diluents may be used for this purpose. Iso-octane is particularly preferred as a diluent for purposes of the present invention.

The trialkylsilylcyclohexyloxytrialkylsilanes are readily hydrolyzed by merely contacting them with water, thus forming the corresponding trialkylsilylcyclohexanol. If desired, a trace of acid or alkaline catalyst may be used in this hydrolysis, but such a catalyst is not particularly necessary.

The trialkylsilylphenoxytrialkylsilanes employed in the process of this invention may be prepared by reacting a halophenoxysilane of the general formula $R_3SiOC_6H_4X$, a silane of the formula $R_3SiX$, and an alkali metal. In these formulae R is alkyl and X is halogen, preferably bromine or chlorine. The preparation of these trialkylsilylphenoxysilanes is related in greater detail in my copending application Serial No. 185,514, filed September 18, 1950. My copending application No. 185,516, also filed September 18, 1950, describes the preparation of alkoxydialkylsilylphenoxyalkoxydialkylsilanes by a comparable method. These alkoxy substituted phenoxy silanes may also be hydrogenated by the method set forth herein to produce the corresponding alkoxy substituted alkylcyclohexyloxysilanes.

The products of this invention are useful as heat exchange media, thermo expansion fluids, and as intermediates in the production of novel organosilicon compounds. Also, as shown in my copending application Serial No. 199,729 filed concurrently herewith, the trialkylsilylcyclohexanols of the present invention may be oxidized with nitric acid to form the corresponding trialkylsilyladipic acids, for example

$R_3SiCH(CH_2CH_2COOH)(CH_2COOH)$

These adipic acid derivatives can be reacted with a diamine such as hexamethylenediamine to form new and useful polyamide resins.

The following examples are illustrative only:

Example 1

12 grams of Raney nickel in 10 ml. of iso-octane was added to 328 grams (1 mol) of para-trimethylsilylphenoxytrimethylsilane in a 1320 ml. Monel reactor. The total volume of the charge was 274 ml., leaving 1046 ml. of gas space in the reactor. Hydrogen was charged to the reactor to a pressure of 1100 pounds per square inch at 25° C., or about 3.19 mols. The reactor was heated at between 90° and 130° C. for 134 minutes, causing the absorption of 1.23 mols of hydrogen (41 per cent of theory). Very little further hydrogenation was apparent after this. The reactor was cooled and 18 grams of fresh Raney nickel was added. The reactor was re-pressurized to 1,000 p. s. i. at 25° C. and heated at 97° to 115° C. until 3.002 mols of hydrogen had been absorbed. The reactor was cooled and the reaction product was distilled. It yielded para-(trimethylsilyl)cyclohexyloxytrimethylsilane in cis and trans isomeric forms. One isomer boiled at 117° to 118° C. at an absolute pressure of 24 mm. mercury and had a refractive index at 25° C. of 1.4384, a density of 0.851 and a specific refraction of 0.3086. The other isomer boiled at 128° C. at 24 mm. pressure, had a refrective index of 1.4435, a density of 0.857, and a specific refraction of 0.3096. The calculated specific refraction is 0.3092. The cis and trans isomers were present in about an equal amount, but the identity concerning which was cis and which was trans was not determined. A small amount of cyclohexyloxytrimethylsilane, having a boiling point of about 70° at a pressure of 24 mm., was also present.

Example 2

The distilled fraction from Example 1, boiling at 117° to 118° C. at 24 mm., was hydrolyzed in aqueous acetone solution and yielded the corresponding isomer of para-trimethylsilylcyclohexanol. This isomer had a melting point of from 57° to 57.5° C. and was found to contain 16.38 per cent by weight silicon. The fraction boiling at 128° C. at 24 mm. was hydrolyzed in the same manner and yielded the other isomer, which had a melting point of from 76° to 76.5° C. and contained 16.18 per cent by weight silicon. The calculated silicon content of $(CH_3)_3SiC_6H_{10}OH$ is 16.28 per cent by weight.

Example 3

10 grams of Raney nickel, .305 mol of para-tri-methylsilylphenoxytrimethylsilane and 35 ml. iso-octane were charged to a Pyrex glass liner inside the 1320 ml. Monel reactor, leaving a gas space of 790 ml. The reactor was pressurized with hydrogen to 900 p. s. i. at 25° C. and heated at from 95° to 130° C. The pressure fell to 650 p. s. i. at 130° C., indicating the absorption of 1.09 mols of hydrogen as compared with the theoretical requirement of 0.915 mol. The reaction product contained para(trimethylsilyl)cyclohexyloxytrimethylsilane.

Example 4

8 grams of Raney nickel, 75 ml. of iso-octane and 41 ml. (0.132 mol) of para[(ethoxydimethylsilyl)phenoxyethoxydimethylsilane was hydrogenated in the glass liner as described above. The reaction started at a temperature of 75° C. and a hydrogen pressure of 1010 p. s. i., going rapidly to completion between 75° and 125° C. 0.41 mol of hydrogen was absorbed. Theory required the absorption of 0.396 mol.

That which is claimed is:

1. Trialkylsilylcyclohexanols of the general formula $R_3SiC_6H_{10}OH$ in which R represents an alkyl radical.

2. A trimethylsilylcyclohexanol of the formula $(CH_3)_3SiC_6H_{10}OH$.

3. p-Trimethylsilylcyclohexanol, $$p-(CH_3)_3SiC_6H_{10}OH.$$

4. The method which comprises reacting a trialkylsilylphenoxytrialkylsilane with hydrogen in the presence of Raney nickel at a reaction temperature above 75° C. and hydrolyzing the reaction product thereof whereby there is obtained a trialkylsilylcyclohexanol.

5. The method which comprises reacting trimethylsilylphenoxytrimethylsilane with hydrogen in the presence of Raney nickel at a reaction temperature of from 90° to 140° C. and hydrolyzing the reaction product thereof whereby there is obtained trimethylsilylcyclohexanol.

6. The method which comprises reacting p-trimethylsilylphenoxytrimethylsilane with hydrogen in the presence of Raney nickel at a reaction temperature of from 90° to 140° C. and hydrolyzing the reaction product thereof whereby there is obtained p-trimethylsilylcyclohexanol.

JOHN L. SPEIER, JR.

No references cited.